United States Patent
Min et al.

(10) Patent No.: US 9,974,023 B2
(45) Date of Patent: *May 15, 2018

(54) APPARATUS, SYSTEM AND METHOD OF COMMUNICATING A WAKEUP PACKET

(71) Applicant: INTEL CORPORATION, Santa Clara, CA (US)

(72) Inventors: Alexander W. Min, Portland, OR (US); Minyoung Park, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 9 days.

This patent is subject to a terminal disclaimer.

(21) Appl. No.: 14/864,930

(22) Filed: Sep. 25, 2015

(65) Prior Publication Data

US 2017/0094600 A1 Mar. 30, 2017

(51) Int. Cl.
*H04W 52/02* (2009.01)
*H04W 76/04* (2009.01)
*H04W 72/04* (2009.01)
*H04L 5/00* (2006.01)
*H04W 8/24* (2009.01)

(52) U.S. Cl.
CPC ....... *H04W 52/0229* (2013.01); *H04L 5/0007* (2013.01); *H04W 8/24* (2013.01); *H04W 72/042* (2013.01); *H04W 76/046* (2013.01)

(58) Field of Classification Search
CPC .......... H04W 52/0229; H04W 76/046; H04W 72/042; H04W 5/0007; H04W 8/02; H04W 52/02; H04W 52/0203; H04W 84/12; H04L 27/04; H04L 27/06; H04L 27/2602
See application file for complete search history.

(56) References Cited

U.S. PATENT DOCUMENTS

2006/0133408 A1* 6/2006 Nogueira-Nine . H04W 52/0219
370/447
2007/0273484 A1* 11/2007 Cederlof ........... H04W 52/0225
340/10.33

(Continued)

OTHER PUBLICATIONS

IEEE Std 802.11™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

(Continued)

*Primary Examiner* — Ian N Moore
*Assistant Examiner* — Phong La
(74) *Attorney, Agent, or Firm* — Shichrur & Co.

(57) ABSTRACT

Some demonstrative embodiments include apparatuses, devices, systems and methods of a wakeup packet response. For example, an apparatus may include circuitry configured to cause a first wireless device to transmit a frame comprising mapping information to map a plurality of Modulation and Coding Schemes (MCS) to a respective plurality of preamble lengths; generate a wakeup packet comprising a preamble having a preamble length of the plurality of preamble lengths corresponding to an MCS of a non-wakeup transmission from the first wireless device; and transmit the wakeup packet to a second wireless device.

24 Claims, 6 Drawing Sheets

(56) References Cited

U.S. PATENT DOCUMENTS

| | | | | |
|---|---|---|---|---|
| 2009/0109944 A1* | 4/2009 | Kwon | ................... | H04W 99/00 370/338 |
| 2010/0097969 A1* | 4/2010 | De Kimpe | ........ | H04W 52/0216 370/311 |
| 2010/0309831 A1* | 12/2010 | Yeh | ................... | H04W 52/0216 370/311 |
| 2011/0064032 A1* | 3/2011 | Sun | ....................... | H04L 5/0007 370/328 |
| 2011/0142176 A1* | 6/2011 | Yokokawa | .............. | H04L 25/02 375/340 |
| 2011/0150254 A1* | 6/2011 | Solum | .................. | H04R 25/554 381/314 |
| 2011/0176465 A1* | 7/2011 | Panta | ................. | H04W 52/0235 370/311 |
| 2011/0305194 A1* | 12/2011 | Zheng | .................. | H04B 7/0452 370/328 |
| 2013/0217428 A1* | 8/2013 | Liu | ................... | H04W 52/0235 455/509 |
| 2014/0071996 A1* | 3/2014 | Tetzlaff | ................. | H04L 1/0061 370/474 |
| 2014/0112225 A1* | 4/2014 | Jafarian | ............ | H04W 52/0235 370/311 |
| 2014/0112230 A1* | 4/2014 | Sammour | ............. | H04J 3/0605 370/311 |
| 2014/0140357 A1* | 5/2014 | Kenney | ................. | H04W 80/00 370/474 |
| 2014/0169245 A1* | 6/2014 | Kenney | ............... | H04L 27/2613 370/311 |
| 2014/0185501 A1* | 7/2014 | Park | .................. | H04W 52/0238 370/311 |
| 2014/0204822 A1* | 7/2014 | Park | .................... | H04W 68/025 370/311 |
| 2014/0269994 A1* | 9/2014 | HomChaudhuri | ......................... | H04W 52/0209 375/316 |
| 2015/0036670 A1* | 2/2015 | Park | .................. | H04W 52/0225 370/338 |
| 2015/0071215 A1* | 3/2015 | Tian | ....................... | H04W 24/08 370/329 |
| 2015/0103707 A1* | 4/2015 | Panta | ................ | H04W 52/0203 370/311 |
| 2015/0131640 A1* | 5/2015 | Seok | ..................... | H04W 28/06 370/338 |
| 2015/0289292 A1* | 10/2015 | Sun | ................... | H04W 74/0833 370/329 |
| 2015/0319747 A1* | 11/2015 | Chu | .................. | H04W 72/0406 370/330 |
| 2016/0021678 A1* | 1/2016 | Merlin | ............. | H04W 72/1268 370/329 |
| 2016/0205686 A1* | 7/2016 | Kim | .................... | H04L 27/2656 370/329 |
| 2017/0019208 A1* | 1/2017 | Garcia Villegas | .... | H04L 1/0009 |

OTHER PUBLICATIONS

Wi-Fi Alliance, Wi-Fi Peer-to-Peer (P2P) Technical Specification Version 1.5, Aug. 4, 2014, 183 pages.

* cited by examiner

US 9,974,023 B2

APPARATUS, SYSTEM AND METHOD OF COMMUNICATING A WAKEUP PACKET

TECHNICAL FIELD

Embodiments described herein generally relate to communicating a wakeup packet.

BACKGROUND

Some computing devices, for example, small computing devices, such as, for example, wearable devices and/or sensors, are constrained by a small battery capacity.

However, such devices may be required to support wireless communication technologies such as, for example, Wi-Fi, and/or Bluetooth (BT), for example, to connect to other computing devices, e.g., a Smartphone, for example, to exchange data.

Exchanging data using the wireless communication technologies may consume power of the battery, and it may be beneficial, or even critical, to minimize energy consumption of one or more communication blocks in such computing devices

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
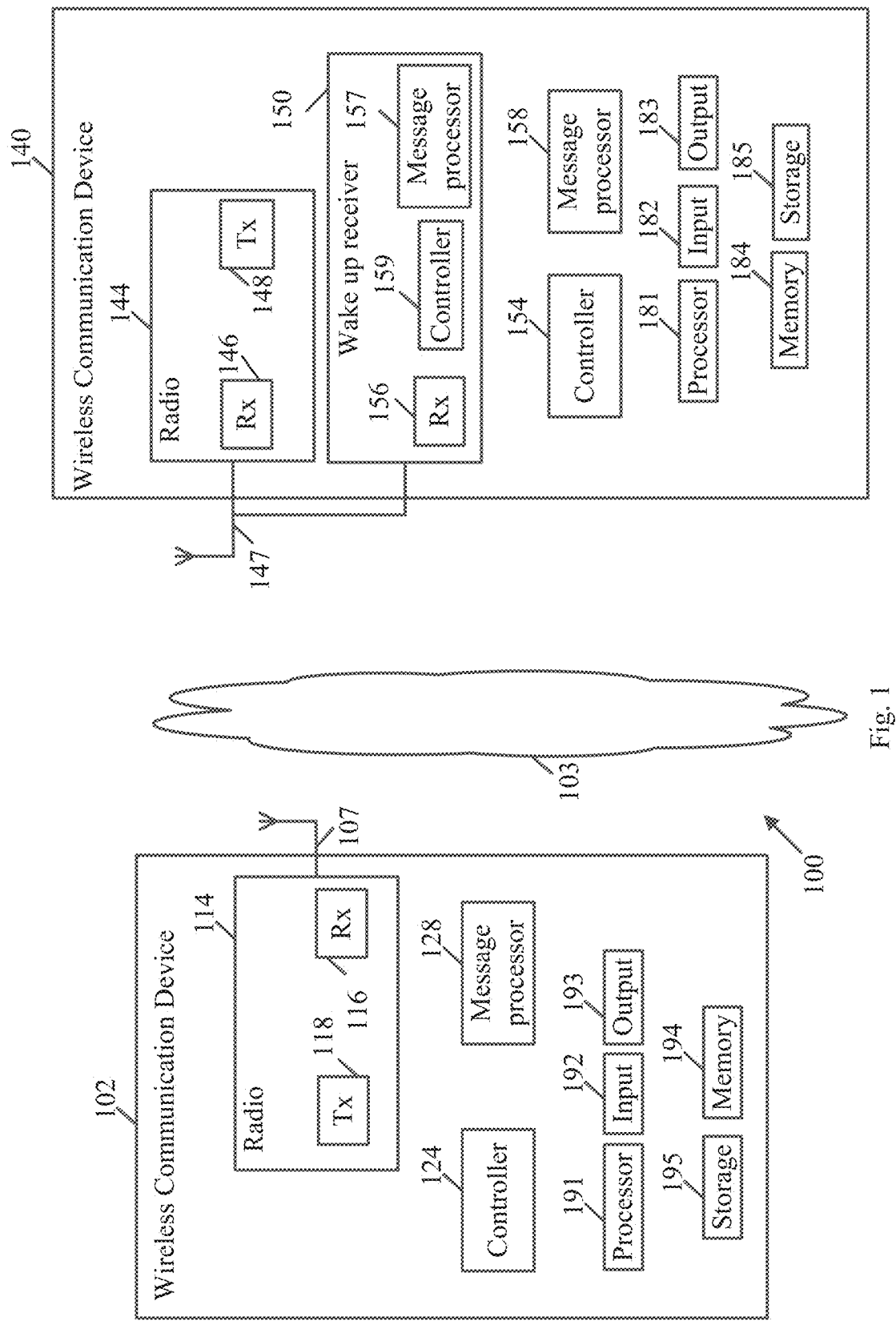
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, an Internet of Things (IoT) device, a sensor device, a wearable device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2012 (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications*, Mar. 29, 2012); IEEE802.11ac-2013 ("*IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz*", December, 2013); IEEE 802.11ad ("*IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High*

*Throughput in the 60 GHz Band"*, 28 *Dec.* 2012); IEEE-802.11REVmc ("*IEEE* 802.11-*REVmc™/D*3.0, *June* 2014 *draft standard for Information technology—Telecommunications and information exchange between systems Local and metropolitan area networks Specific requirements; Part* 11: *Wireless LAN Medium Access Control (MAC) and Physical Layer (PHY) Specification*"); IEEE 802.11ax (*IEEE* 802.11*ax, High Efficiency WLAN* (*HEW*)); IEEE802.11-ay (P802.11*ay Standard for Information Technology—Telecommunications and Information Exchange Between Systems Local and Metropolitan Area Networks—Specific Requirements Part* 11: *Wireless LAN Medium Access Control (MAC) and Physical Layer (PHY) Specifications—Amendment: Enhanced Throughput for Operation in License—Exempt Bands Above* 45 *GHz*)) and/or future versions and/or derivatives thereof) and/or future versions and/or derivatives thereof, devices and/or networks operating in accordance with existing Wireless-Gigabit-Alliance (WGA) specifications (*Wireless Gigabit Alliance, Inc WiGig MAC and PHY Specification Version* 1.1, *April* 2011, *Final specification*) and/or future versions and/or derivatives thereof, devices and/or networks operating in accordance with existing Wireless Fidelity (WiFi) Alliance (WFA) Peer-to-Peer (P2P) specifications (*WiFi P2P technical specification, version* 1.5, *Aug.* 4, 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, devices and/or networks operating in accordance with existing Bluetooth (BT) specifications and/or protocols and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a first wireless communication device 102, and/or a second wireless communication device 140.

In some demonstrative embodiments, device 102 and/or device 140 may include a mobile device or a non-mobile, e.g., a static, device. For example, device 102 and/or device 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a wearable device, a BT device, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 and/or device 140 may include, operate as, and/or perform the functionality of one or more STAs. For example, device 102 may include at least one STA, and/or device 140 may include at least one STA.

In some demonstrative embodiments, device 102 and/or device 140 may include, operate as, and/or perform the functionality of one or more WLAN STAs.

In some demonstrative embodiments, device 102 and/or device 140 may include, operate as, and/or perform the functionality of one or more Wi-Fi STAs.

In some demonstrative embodiments, device 102 and/or device 140 may include, operate as, and/or perform the functionality of one or more BT devices.

In some demonstrative embodiments, device 102 and/or device 140 may include, operate as, and/or perform the functionality of one or more Neighbor Awareness Networking (NAN) STAs.

In some demonstrative embodiments, device 102 and/or device 140 may include, operate as, and/or perform the functionality of one or more location measurement STAs.

In one example, a station (STA) may include a logical entity that is a singly addressable instance of a medium access control (MAC) and physical layer (PHY) interface to the wireless medium (WM). The STA may perform any other additional or alternative functionality.

In some demonstrative embodiments, device 102 and/or device 140 may include, operate as, and/or perform the functionality of any other devices and/or STAs.

In some demonstrative embodiments, devices 102 and/or 140 may be configured to operate as, and/or to perform the functionality of, an access point (AP), and/or a personal basic service set (PBSS) control point (PCP), for example, an AP/PCP STA.

In some demonstrative embodiments, devices 102 and/or 140 may be configured to operate as, and/or to perform the functionality of, a non-AP STA, and/or a non-PCP STA, for example, a non-AP/PCP STA.

In one example, an AP may include an entity that contains a station (STA), e.g., one STA, and provides access to distribution services, via the wireless medium (WM) for associated STAs. The AP may perform any other additional or alternative functionality.

In one example, a personal basic service set (PBSS) control point (PCP) may include an entity that contains a STA, e.g., one station (STA), and coordinates access to the wireless medium (WM) by STAs that are members of a PBSS. The PCP may perform any other additional or alternative functionality.

In one example, a PBSS may include a directional multi-gigabit (DMG) basic service set (BSS) that includes, for example, one PBSS control point (PCP). For example, access to a distribution system (DS) may not be present, but, for example, an intra-PBSS forwarding service may optionally be present.

In one example, a PCP/AP STA may include a station (STA) that is at least one of a PCP or an AP. The PCP/AP STA may perform any other additional or alternative functionality.

In one example, a non-AP STA may include a STA that is not contained within an AP. The non-AP STA may perform any other additional or alternative functionality.

In one example, a non-PCP STA may include a STA that is not a PCP. The non-PCP STA may perform any other additional or alternative functionality.

In one example, a non PCP/AP STA may include a STA that is not a PCP and that is not an AP. The non-PCP/AP STA may perform any other additional or alternative functionality.

In one example, device 102 may be configured to operate as, and/or to perform the functionality of the AP, and/or device 140 may be configured to operate as, and/or to perform the functionality of a non-PCP/AP STA.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Device 102 and/or device 140 may optionally include other suitable additional or alternative hardware components and/or software components. In some demonstrative embodiments, some or all of the components of one or more of device 102 and/or device 140 may be enclosed in a common housing or packaging, and may be interconnected or operably associated using one or more wired or wireless links. In other embodiments, components of one or more of device 102 and/or device 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication device 102 and/or device 140 may be capable of communicating content, data, information and/or signals via a wireless medium (WM) 103. In some demonstrative embodiments, wireless medium 103 may include, for example, a radio channel, a cellular channel, an RF channel, a WiFi channel, an IR channel, a Bluetooth (BT) channel, a Global Navigation Satellite System (GNSS) Channel, and the like.

In some demonstrative embodiments, WM 103 may include a channel over a 2.4 Gigahertz (GHz) frequency band, a channel over a 5 GHz frequency band, a channel over a millimeterWave (mmWave) frequency band, e.g., a 60 GHz frequency band, a channel over a sub 1 Gigahertz (S1G) frequency band, and/or any other channel over any other band.

In some demonstrative embodiments, device 102 and/or device 140 may include one or more radios including circuitry and/or logic to perform wireless communication between devices 102, 140 and/or one or more other wireless communication devices. For example, device 102 may include at least one radio 114, and/or device 140 may include at least one radio 144.

In some demonstrative embodiments, radios 114 and/or 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at lest one receiver 146.

In some demonstrative embodiments, radios 114 and/or 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114, radio 144, transmitter 118, transmitter 148, receiver 116, and/or receiver 148 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radios 114 and/or 144 may include or may be implemented as part of a wireless Network Interface Card (NIC), and the like.

In some demonstrative embodiments, radios 114 and/or 144 may include, or may be associated with, one or more antennas 107 and/or 147, respectively.

In one example, device 102 may include a single antenna 107. In another example, device 102 may include two or more antennas 107.

In one example, device 140 may include a single antenna 147. In another example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, device 102 may include a controller 124, and/or device 140 may include a controller 154. Controllers 124 and/or 154 may be configured to perform one or more communications, may generate and/or communicate one or more messages and/or transmissions, and/or may perform one or more functionalities, operations and/or procedures between devices 102, and/or 140 and/or one or more other devices, e.g., as described below.

In some demonstrative embodiments, controllers 124 and/or 154 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, device 102 and/or device 140 may include a wearable device, a sensor, small device, a mobile device, and/or any other device, which may be, for example, powered by a battery and/or any other power source having a limited capacity.

In some demonstrative embodiments, device 102 and/or device 140 may support wireless communication technologies such as, for example, Wi-Fi, Bluetooth (BT), and/or any other additional or alternative technology, for example, to connect between device 102, device 140, and/or other wireless devices.

In some demonstrative embodiments, device 140 may include a wearable device and/or a sensor device powered by a power source having a limited capacity, e.g., a small battery.

In some demonstrative embodiments, device 140 may be configured to communicate data with another device, e.g., device 102, which may be less power constrained than device 140, for example, a Smartphone.

In some demonstrative embodiments, communicating data between device 102 and device 140 may consume power of the power source of device 140.

In some demonstrative embodiments, minimizing energy consumption of one or more communication blocks, modules and/or elements of device 140 may be beneficial, and in some cases, even critical, for example, in order to reduce and/or minimize power consumption of the power source of device 140.

In some demonstrative embodiments, power consumption of device 140 may be reduced, e.g., minimized, for example, by powering off one or more communication blocks, modules and/or elements of device 140, e.g., as much as possible, for example, while maintaining data transmission and/or reception capabilities of device 140, e.g., without substantially increasing latency and/or degrading quality of data communication.

In one example, one or more communication blocks, modules and/or elements of device 140 may be powered on and/or may be woken up, for example, only when there is data to transmit, and/or only when there is data to receive. According to this example, the one or more communication blocks, modules and/or elements of device 140 may be powered off and/or switched to a sleep mode, for example, for the rest of the time.

For example, one or more elements of radio 144 may be powered on and/or may be woken up, for example, only when device 140 has data to transmit, and/or only when device 140 has data to receive. According to this example, one or more elements of radio 144 may be powered off and/or switched to the sleep mode, for example, for the rest of the time.

In some demonstrative embodiments, device 140 may include a wakeup receiver 150 configured to power on and/or to wakeup radio 144 of device 140.

In some demonstrative embodiments, wakeup receiver 150 may wakeup radio 144, for example, based on a packet, e.g., a wakeup packet, received from another device, e.g., device 102, which is, for example, to transmit data to device 140.

In some demonstrative embodiments, wakeup receiver 150 may include a receiver 156 configured to receive the wakeup packet.

In some demonstrative embodiments, wakeup receiver 150 may include circuitry and/or logic configured to receive, decode, demodulate, and/or process the wakeup packet.

In some demonstrative embodiments, receiver 156 may include circuitry; logic; Radio Frequency (RF) elements, circuitry and/or logic; baseband elements, circuitry and/or logic; demodulation elements, circuitry and/or logic; amplifiers; analog to digital converters; filters; and/or the like.

In some demonstrative embodiments, wakeup receiver 150 may include a controller 159 configured to control one or more operations and/or functionalities of wakeup receiver 150, e.g., for processing the wakeup packet and/or waking up radio 144. For example, controller 159 may be configured to control a power supply of radio 144, and/or any other mechanism to wakeup radio 144, e.g., upon determining that a wakeup packet has been received by wakeup receiver 150.

In some demonstrative embodiments, controller 159 may be configured to perform one or more communications, to generate and/or communicate one or more messages and/or transmissions, and/or to perform one or more functionalities, operations and/or procedures, e.g., as described below.

In some demonstrative embodiments, controller 159 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controller 159. Additionally or alternatively, one or more functionalities of controller 159 may be implemented by logic, which may be executed by a machine and/or one or more processors, e.g., as described below.

In one example, controller 159 may include circuitry and/or logic, for example, one or more processors including circuitry and/or logic, to cause a wireless device, e.g., device 140, and/or a wireless station, e.g., a wireless STA implemented by device 140, to perform one or more operations, communications and/or functionalities, e.g., as described herein.

In some demonstrative embodiments, wakeup receiver 150 may include a message processor 157 configured to process and/or access one or messages communicated by wakeup receiver 150.

In some demonstrative embodiments, message processor 157 may be configured to process one or more wakeup packets received by wakeup receiver 150, and/or to indicate to controller 159 that a wakeup packet is received.

In one example, message processor 157 may be configured to access, process, demodulate and/or decode reception of the wakeup packets by a wireless station, e.g., a wireless STA implemented by device 140.

In some demonstrative embodiments, message processor 157 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processor 157. Additionally or alternatively, one or more functionalities of message processor 157 may be implemented by logic, which may be executed by a machine and/or one or more processors, e.g., as described below.

In some demonstrative embodiments, at least part of the functionality of message processor 157 may be implemented as part of message processor 158.

In some demonstrative embodiments, at least part of the functionality of message processor 157 may be implemented as part of any other element of wakeup receiver 150. For example, at least part of the functionality of message processor 157 may be implemented as part of receiver 156 and/or controller 159.

In some demonstrative embodiments, at least part of the functionality of receiver 156, controller 159 and/or message processor 157 may be implemented by an integrated circuit, for example, a chip, e.g., a System on Chip (SoC). In one example, the chip or SoC may be configured to perform one or more functionalities of radio 144, controller 154 and/or message processor 158. For example, the chip or SoC may include one or more elements of controller 159, one or more elements of message processor 157, and/or one or more elements of receiver 156, one or more elements of radio 144, one or more elements of message processor 158, and/or one or more elements of controller 154. In one example, wakeup receiver 150, message processor 158, controller 154, and/or radio 144 may be implemented as part of the chip or SoC.

In other embodiments, radio 144, wakeup receiver 150, controller 154 and/or message processor 158 may be implemented by one or more additional or alternative elements of device 140.

In some demonstrative embodiments, wakeup receiver 150 may be associated with one or more of antennas 147, e.g., which may be shared with radio 144.

In other embodiments, wakeup receiver 150 may include, or may be associated with, another, e.g., separate, antenna.

In some demonstrative embodiments, wakeup receiver 150 may be configured to wakeup radio 144, for example, if device 140 has data to transmit, and/or if data is to be received by radio 144.

In one example, wakeup receiver 150 may be configured to implement a low-power wakeup receiver (LP-WUR) scheme, for example, to wakeup radio 144, e.g., only when device 140 is to receive data and/or to transmit data.

In some demonstrative embodiments, the LP-WUR scheme, may introduce a power save mode ("LP-WUR mode"), for example, to an IEEE 802.11 Specification, e.g., as described below.

In some demonstrative embodiments, a device including an LP-WUR ("LP-WUR STA/Device") may be configured to enter a mode ("LP-WUR mode"), e.g., in which the device is to turn off or power down a radio, e.g., an 802.11 radio, and operate the LP-WUR to wait for a wakeup packet.

In one example, device 140 including wakeup receiver 150 may be configured to enter the LP-WUR mode, in which the device 140 is to turn off or power down radio 144 radio and operate wakeup receiver 150 to wait for a wakeup packet.

In some demonstrative embodiments, wakeup receiver 150 may have, for example, a relatively low power consumption, e.g., less than 100 microwatts. Accordingly, the power consumption of device 140 may be reduced for example, during times when there is no data to be received at device 140 and only wakeup receiver 150 is on.

In some demonstrative embodiments, wakeup receiver 150 may wakeup radio 144, for example, based on a wakeup packet received from device 102.

In one example, receiver 156 may be configured to receive the wakeup packet from device 102, message processor 156 may be configured to process the wakeup packet, and/or controller 159 may be configured to wakeup radio 144.

In some demonstrative embodiments, device 102 may be configured to transmit the wakeup packet to device 140, for example, to indicate to wakeup receiver 150 that the radio 144 is to be woken up, e.g., to receive data from device 102.

In some demonstrative embodiments, controller 159 may be configured to cause radio 144 to wakeup, e.g., to switch to an active mode, for example, to receive data from device 102, e.g., subsequent to receiving the wakeup packet from device 102.

In some demonstrative embodiments, controller 159 may be configured to cause, control and/or trigger radio 144 to wakeup, e.g., to switch to an active mode, for example, to transmit data to device 102 and/or to another device.

In some demonstrative embodiments, device 102 and/or device 140 may be configured to communicate the wakeup packet, for example, in compliance with one or more wireless communication standards and/or protocols.

In some demonstrative embodiments, device 102 and/or device 140 may be configured to communicate the wakeup packet, for example, in compliance with one or more existing wireless communication standards and/or protocols ("legacy standards"), for example, in compliance with one or more IEEE 802.11 standards.

In some demonstrative embodiments, the wakeup packet may include a preamble in compliance with one or more legacy standards, for example, to enable one or more legacy devices to decode and/or process the preamble.

In some demonstrative embodiments, the wakeup packet may include a payload, e.g., following the legacy preamble.

In some demonstrative embodiments, the payload may be modulated by a simple modulation scheme, for example, an On-Off Keying (OOK) modulation scheme.

Some demonstrative embodiments are described herein with respect to an OOK modulation scheme. However, in other embodiments the wakeup packet may include a payload modulated according to any other Amplitude-Shift Keying (ASK) modulation scheme, a Frequency Shift Keying (FSK) modulation scheme, and/or any other modulation scheme.

Figure 2:
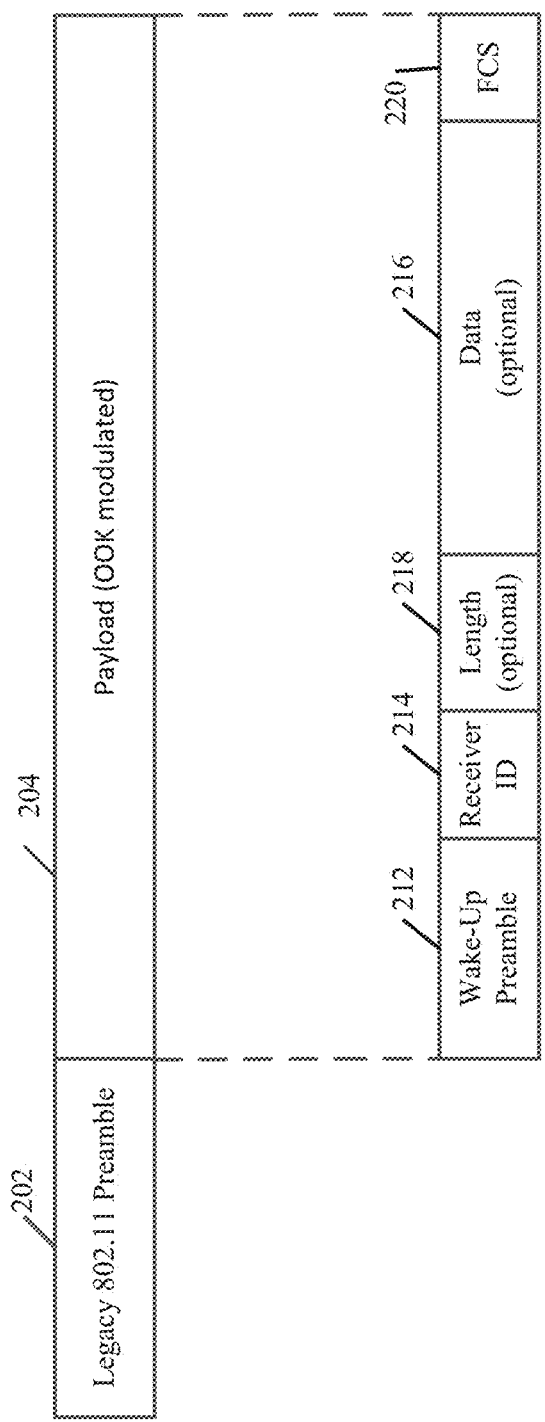
FIG. 2 is a schematic illustration of wakeup packet structure, in accordance with some demonstrative embodiments.

Reference is made to FIG. 2, which schematically illustrates a structure of a wakeup packet 200, in accordance with some demonstrative embodiments.

For example, device 102 (FIG. 1) may be configured to generate and/or transmit wakeup packet 200; and/or device 140 (FIG. 1) may be configured to process wakeup packet 200, e.g., received from device 102.

In some demonstrative embodiments, as shown in FIG. 2, wakeup packet 200 may include a preamble 202, for example, in accordance with a preamble structure defined by an IEEE 802.11 Specification, or any other preamble.

In some demonstrative embodiments, as shown in FIG. 2, wakeup packet 200 may include a payload 204.

In some demonstrative embodiments, payload 204 may be modulated by a simple modulation scheme, for example, an on-off Keying (OOK) modulation scheme.

In some demonstrative embodiments, payload 204 may be modulated using a granularity of an OFDM symbol length, e.g., a granularity of 4 microsecond (us).

In other embodiments wakeup packet 200 may include a payload 204 modulated according to any other amplitude-shift keying (ASK) modulation scheme, a Frequency Shift Keying (FSK) modulation scheme, and/or any other modulation scheme.

In some demonstrative embodiments, payload 204 may include a wakeup preamble 212.

In some demonstrative embodiments, wakeup preamble 212 may include a sequence of bits, for example, configured to identify wakeup packet 200.

In some demonstrative embodiments, as shown in FIG. 2, payload 204 may include a Receiver Identifier (ID) 214, which may include, for example, address information of a device to receive wakeup packet 200, e.g., device 140 (FIG. 1).

In some demonstrative embodiments, the address information may include, for example, a MAC address of a device ("the wakeup Rx STA"), which is to receive wakeup packet 200, a partial MAC address of the wakeup Rx STA, a hashed value of the MAC addresses of the wakeup Rx STA and the sender of wakeup packet 200, e.g., device 102 (FIG. 1), and/or any other value to indicate the wakeup Rx STA to receive wakeup packet 200.

In some demonstrative embodiments, as shown in FIG. 2, payload 204 may optionally include a data field 216.

In some demonstrative embodiments, as shown in FIG. 2, payload 204 may optionally include a Length field 218, for example, to indicate the length of the data field 216.

In some demonstrative embodiments, as shown in FIG. 2, payload 204 may include a Frame Check Sequence (FCS) field 220, for example, including a Cyclic Redundancy Check (CRC) value, e.g. a CRC-8 value or a CRC-16 value, for example, of Receiver ID field 214 and the data field 216.

Figure 3:
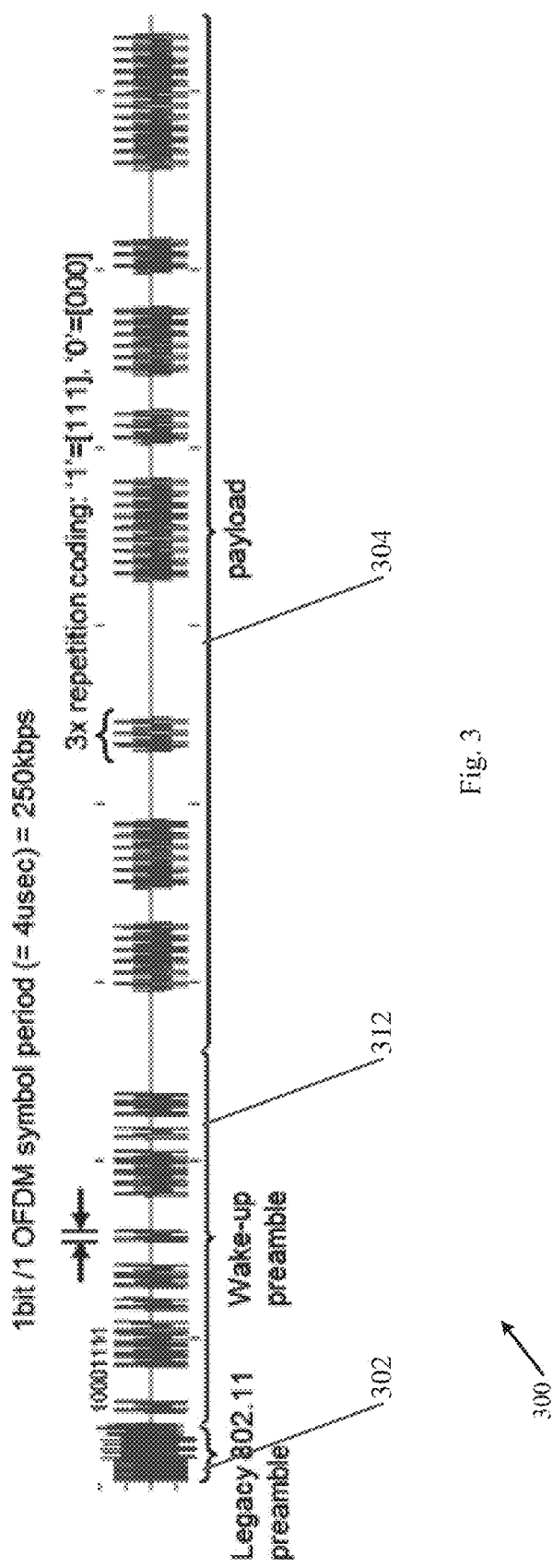
FIG. 3 is a schematic illustration of a wakeup packet transmission, in accordance with some demonstrative embodiments.

Reference is made to FIG. 3, which schematically illustrates a transmission of a wakeup packet 300, in accordance with some demonstrative embodiments.

In one example, device 102 (FIG. 1) may transmit wakeup packet 300 to device 140 (FIG. 1), for example, to indicate to wakeup receiver 150 (FIG. 1) that radio 144 (FIG. 1) is to be woken up.

As shown in FIG. 3, wakeup packet 300 may include a legacy preamble 302, e.g., legacy preamble 202 (FIG. 2), followed by a payload 304, e.g., payload 204 (FIG. 2).

In some demonstrative embodiments, legacy preamble 302 may be modulated according to an OFDM modulation scheme.

In some demonstrative embodiments, payload 304 may be modulated according to the OOK modulation scheme, e.g., as described above.

As shown in FIG. 3, payload 304 may include a wakeup preamble 312, e.g., wakeup preamble 212 (FIG. 2).

Referring back to FIG. 1, in some demonstrative embodiments, it may be disadvantage and/or inefficient to use a wakeup preamble having a fixed-length (the "fixed-length wakeup preamble").

In some demonstrative embodiments, the fixed-length wakeup preamble may be designed to provide a predefined transmission range ("WiFi transmission range"), e.g., in accordance with an IEEE 802.11 Specification.

In some demonstrative embodiments, the fixed-length wake-up preamble may not be sufficient to meet varying system requirements. For example, the fixed-length wakeup preamble may not provide enough flexibility for different transmission ranges.

In some demonstrative embodiments, transmission ranges may be varied, for example, based on a density of the wireless medium 103.

In some demonstrative embodiments, the fixed-length wake-up preamble may have a length of 30 bits, for example, to meet one or more sensitivity requirements, for example, a sensitivity requirement ("the WiFi sensitivity requirement") in accordance with an IEEE 802.11 Specification, e.g., a sensitivity of −82 decibel-milliwatts (dBm); and/or to achieve a desired Packet Error Rate (PER) performance, for example, to provide a predefined transmission range.

In some demonstrative embodiments, if a bit of the 30 bits is using an OFDM symbol having a duration of 4 μs, an entire duration of the fixed-length wakeup preamble may be 120 μs, e.g., 30 bits×4 μs, which may occupy, approximately 25 percent of the entire duration of the wakeup packet, e.g., wakeup packet 200 (FIG. 2).

In some demonstrative embodiments, in a dense Wi-Fi environment, e.g., in accordance with the IEEE 802.11ax specification, a transmission range of the wakeup packet may be reduced, for example, to avoid interference between devices in the dense environment. Accordingly, using the fixed-length wake-up preamble, which occupies a large portion of the duration of the wakeup packet, may increase power consumption of a device transmitting the wakeup packet (the "wakeup Tx STA/device"), and/or may not be flexible enough to provide different sensitivity requirements and/or transmission ranges, e.g., for transmission of the wakeup packet.

In some demonstrative embodiments, device 102 and/or device 140 may be configured to perform one or more methods and/or procedures to match between a range of a wakeup packet transmission and a Wi-Fi transmission range, for example, by using different wakeup preamble designs, structures and/or lengths, e.g., as described below.

In some demonstrative embodiments, using the different wakeup preamble designs may enable an LP-WUR device to be associated with one or more APs, which may be located in proximity to the LP-WUR device, for example, instead of being associated with faraway APs, which are located faraway from the LP-WUR device.

In some demonstrative embodiments, using the different wakeup preamble designs may enable an LP-WUR device to avoid attempting unnecessary handoffs, e.g., with the faraway APs. Accordingly, using the different wakeup preamble designs may improve a performance of system 100.

In some demonstrative embodiments, device 102 and/or device 140 may be configured to dynamically adjust a length of the wakeup preamble, for example, based on a transmission range requirement of the wakeup Tx device, e.g., device 102.

In some demonstrative embodiments, device 102 may be configured to reduce a length of the wakeup preamble, for example, if device 102 is in a dense network, e.g., a Wi-Fi network, having a reduced transmission range requirement.

In some demonstrative embodiments, device 102 may be configured to reduce the length of the wakeup preamble, for example, to match the reduced transmission range requirement.

In some demonstrative embodiments, device 102 and/or device 140 may be configured to reduce an overhead, e.g., in terms of utilization of WM 103 and energy consumption of device 102 and/or device 140, for example, for processing the wakeup packet transmission.

In some demonstrative embodiments, device 102 and/or device 140 may be configured to reduce the overhead, for example, by reducing the length of the wakeup preamble, e.g., when a transmission range of the wakeup packet can be reduced, e.g., as described below.

Figure 4:
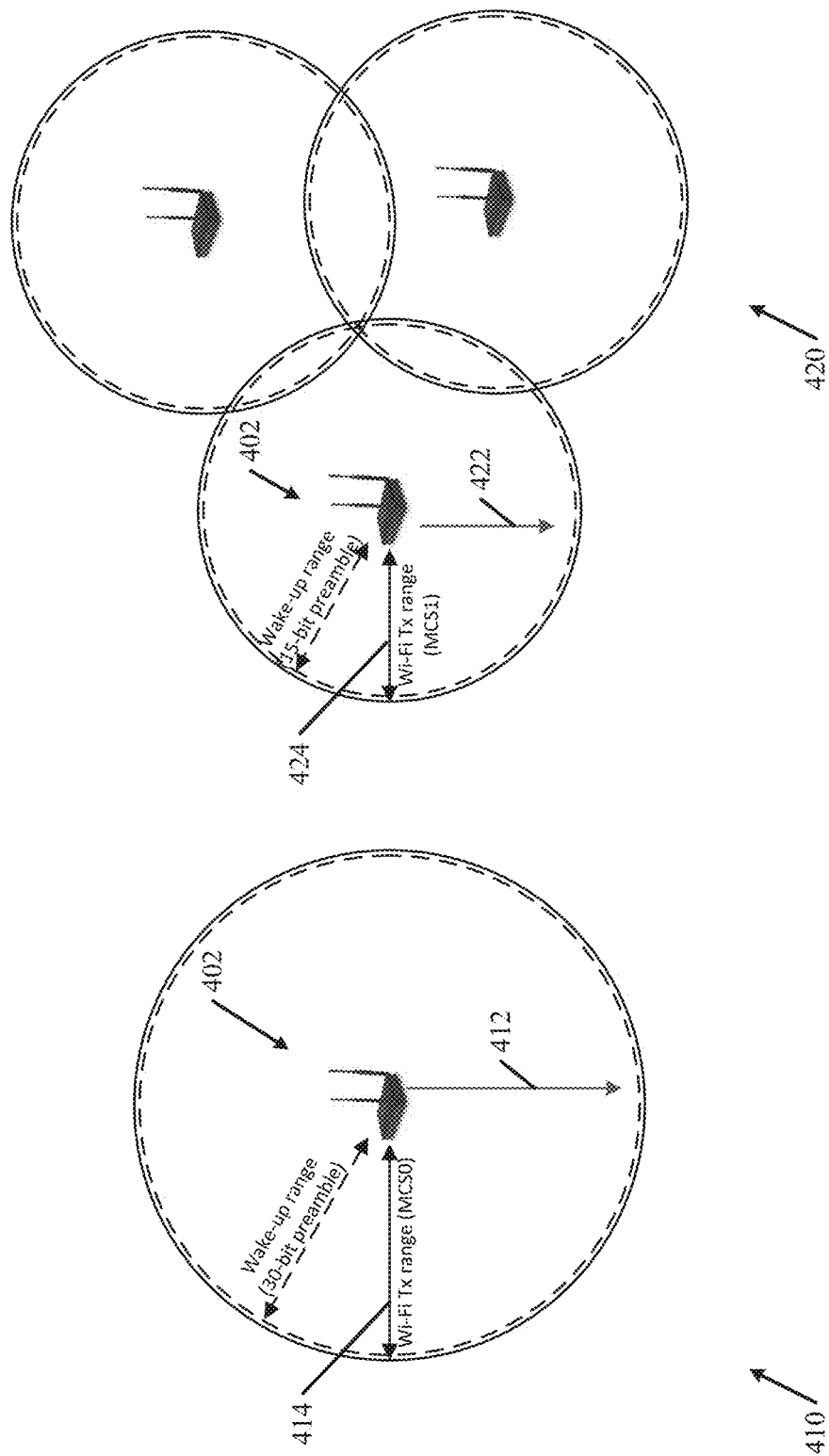
FIG. 4 is a schematic illustration of two transmission schemes, in accordance with some demonstrative embodiments.

Reference is made to FIG. 4, which schematically illustrates a first transmission scheme 410 of a transmission of a first wakeup packet 412, and a second transmission scheme 420 of a transmission of second wakeup packet 422, in accordance with some demonstrative embodiments.

In some demonstrative embodiments, as shown in FIG. 4, wakeup packets 412 and 422 may be transmitted by a wakeup Tx device 402, e.g., an AP. For example, wakeup Tx device 402 may perform the functionality of device 102 (FIG. 2).

In some demonstrative embodiments, as shown in FIG. 4, wakeup packet 412 may be transmitted in a sparse environment.

In some demonstrative embodiments, as shown in FIG. 4, transmissions in the sparse environment may be performed using a first Modulation and Coding Scheme, e.g., an MCS0, for example, using Binary Phase Shift Keying (BPSK) at a data rate of ½.

In some demonstrative embodiments, as shown in FIG. 4, the transmissions in the sparse environment may cover a first coverage range 414, for example, to meet a first sensitivity requirement ("the MCS0 sensitivity requirement") for the MCS0, for example, a sensitivity requirement of −82 dBm.

In some demonstrative embodiments, as shown in FIG. 4, a transmission of wakeup packet 412 may be configured to meet the MCS0 sensitivity requirement.

In some demonstrative embodiments, as shown in FIG. 4, the transmission of wakeup packet 412 may also be configured to cover the range 414, for example, to meet the MCS0 sensitivity requirement.

In some demonstrative embodiments, wakeup packet 412 may include a wakeup preamble having a preamble length of 30 bits, for example, to cover the range 414 and to meet the MCS0 sensitivity requirement.

In some demonstrative embodiments, as shown in FIG. 4, wakeup packet 422 may be transmitted in a dense environment.

In some demonstrative embodiments, as shown in FIG. 4, transmissions in the dense environment may use a higher data rate, for example, according to a second MCS, e.g., an MCS1.

In some demonstrative embodiments, as shown in FIG. 4, the transmissions in the dense environment may cover a second coverage range 424, for example, to meet a sensitivity requirement (the "MCS1 sensitivity requirement") for the MCS1, for example, a sensitivity requirement of −79 dBm.

In some demonstrative embodiments, if a transmission of wakeup packet 422 is configured to meet the MCS1 sensitivity requirement, the preamble length of the wakeup preamble of wakeup packet 422 may be reduced, e.g., to a length of 15 bits, while still meeting the MCS1 sensitivity requirement and the coverage range 424.

Referring back to FIG. 1, in some demonstrative embodiments, device 102 may be configured to determine a preamble length of a wakeup preamble of a wakeup packet, e.g., as described below.

In some demonstrative embodiments, device 102 may be configured to determine the preamble length, for example, based on an MCS of a transmission from device 102, e.g., as described below.

In some demonstrative embodiments, device 102 may be configured to announce to one or more other devices, e.g., device 140, a mapping between the MCS and the preamble length, e.g., as described below.

In some demonstrative embodiments, controller 124 may control, cause and/or trigger device 102 to transmit a frame including mapping information to map a plurality of Modulation and Coding Schemes (MCS) to a respective plurality of preamble lengths.

In some demonstrative embodiments, the frame including the mapping information may include a beacon frame transmission from device 102, for example, if device 102 operates as an AP.

In some demonstrative embodiments, the frame including the mapping information may include a probe response frame from device 102, e.g., in response to a probe request frame from device 140.

In some demonstrative embodiments, the mapping information may include a table including the plurality of MCS and the respective plurality of preamble lengths, for example, in terms of a predefined value, denoted N, e.g., as follows:

TABLE 1

| | Receiver sensitivity requirement | Wake-up preamble length |
|---|---|---|
| MCS0 (BPSK ½) | −82 dBm | N bits |
| MCS1 (QPSK ½) | −79 dBm | N/2 bits |
| MCS2 (QPSK ¾) | −77 dBm | N/4 bits |
| MCS3 (16-QAM ½) | −74 dBm | N/8 bits |

In some demonstrative embodiments, the value of N may be 30, or any other integer value.

In other embodiments, any other mapping between the MCS and the preamble length may be used.

In some demonstrative embodiments, Table 1 may include a mapping between the plurality of MCS and the respective plurality of preamble lengths, e.g., in accordance with MCS of an IEEE 802.11ac standard and a 20 MHz PPDU.

In some demonstrative embodiments, controller 154 may control, cause and/or trigger device 140 to process the frame from device 102 including the mapping information to map the plurality of MCS to the plurality of preamble lengths.

In some demonstrative embodiments, controller 154 and/or controller 159 may control, cause and/or trigger device 140 to switch radio 144 to a power save mode.

In some demonstrative embodiments, device 140 may be configured to wait for a wakeup packet, for example, to wake up radio 144 to receive data.

In some demonstrative embodiments, controller 124 may be configured to control, cause and/or trigger device 102 to generate a wakeup packet including a preamble having a preamble length corresponding to an MCS of a non-wakeup transmission from device 102, e.g., as described below.

For example, the non-wakeup transmission from device 102 may use the MCS2. According to this example, controller 124 may control, cause and/or trigger device 102 to generate a wakeup packet including a preamble having a preamble length ("the selected preamble length") corresponding to the MCS2, e.g., a preamble length of N/4 bits according to Table 1.

In some demonstrative embodiments, controller 124 may control, cause and/or trigger device 102 to transmit the wakeup packet to device 140.

In some demonstrative embodiments, controller 124 may control, cause and/or trigger message processor 128 to generate the wakeup packet including the preamble having the selected preamble length, and/or controller 124 may control, cause and/or trigger transmitter 118 to transmit the wakeup packet to device 140.

In some demonstrative embodiments, device 140 may receive the wakeup packet including the preamble having the preamble length corresponding to the MCS of the non-wakeup transmission from device 102.

In some demonstrative embodiments, controller 159 may control, cause and/or trigger wakeup receiver 150 to process the wakeup packet including the preamble having the preamble length corresponding to the MCS of the non-wakeup transmission from device 102.

In some demonstrative embodiments, controller 159 may determine whether or not to wakeup radio 144, for example, based on the payload of the wakeup packet.

In some demonstrative embodiments, the non-wakeup transmission may include a beacon frame transmission from device 102.

In some demonstrative embodiments, controller 124 may control, cause and/or trigger device 102 to generate the wakeup packet including a preamble length corresponding to an MCS ("the beacon MCS") of the beacon frame transmission from device 102.

For example, device 102 may generate the wakeup packet including a preamble length of 15-bits, e.g., N=30/2, for example, if MCS1 is used for the beacon frame transmission from device 102.

In some demonstrative embodiments, the non-wakeup transmission may include a data transmission from device 102.

In some demonstrative embodiments, controller 124 may be configured to control, cause and/or trigger device 102 to generate the wakeup packet including a preamble corresponding to an MCS ("the data MCS") of the data transmission from device 102.

For example, device 102 may generate the wakeup packet including a preamble length of about N/4 bits, e.g., 8 bits, for example, if MCS2 is used for the data transmission from device 102, e.g., in accordance with Table 1.

In some demonstrative embodiments, device 102 may be configured to determine the preamble length, for example, according to a first length setting scheme.

In some demonstrative embodiments, an AP, e.g., device 102, may be configured to use the MCS of the same non-wakeup transmission to determine the preamble length, for example, regardless of the purpose of the wake-up packet.

In some demonstrative embodiments, device 102 may be configured to determine the preamble length, for example, based on the MCS used in a beacon frame from device 102, e.g., by selecting a preamble length in Table 1 corresponding to the MCS used in the beacon frame.

In some demonstrative embodiments, controller 124 may be configured to control, cause and/or trigger device 102 to generate the wakeup packet including a preamble length corresponding to the MCS of the beacon frame transmission from device 102.

In some demonstrative embodiments, device 140 may receive the beacon frame from device 102, and may be aware of the MCS of the beacon frame.

In some demonstrative embodiments, device 140 may determine the preamble length, for example, based on the MCS of the beacon frame and the mapping information received from device 102. Accordingly, device 140 may be aware of the preamble length of the wakeup packet to be received from device 102.

In one example, a STA, e.g., device 140, may use the wake-up packet preamble that corresponds to the MCS, which an AP, e.g., device 102, uses for the beacon transmission. The STA may determine the length of the wakeup preamble, for example, based on the mapping information transmitted by the AP.

In some demonstrative embodiments, device 102 may be configured to determine the preamble length of the wakeup packet, for example, according to a second length setting scheme.

In some demonstrative embodiments, an AP, e.g., device 102, may be configured to use the MCS of different non-wakeup transmissions to determine the preamble length, for example, based on the purpose of the wake-up packet.

In some demonstrative embodiments, device 102 may be configured to select between using an MCS of a first non-wakeup transmission to determine the preamble length, and an MCS of second non-wakeup transmission to determine the preamble length, for example, based on the purpose of the wakeup packet.

In some demonstrative embodiments, device 102 may be configured to select between an MCS of a beacon frame, and an MCS of a data frame transmission, for example, to determine the preamble length of the wakeup packet.

In some demonstrative embodiments, device 102 may select to use the MCS of the beacon frame, for example, if the wakeup packet is configured to include beacon information.

In some demonstrative embodiments, device 102 may select to use the MCS of the data transmission, for example, if the wakeup packet is configured to wakeup a radio of the wakeup RX STA.

In one example, if the wake-up packet is configured as a "wakeup beacon", which includes beacon information, e.g., partial beacon information, e.g., if data field 216 (FIG. 2) includes the partial beacon information, then the AP may select to use a preamble length corresponding to the MCS used in the beacon frame.

In another example, if the wake-up packet is configured to wake-up a Wi-Fi radio, e.g., radio 144, for example, to communicate data with the radio, then the AP may select to use a preamble length corresponding to the MCS to be used in a following data packet transmission to the radio, e.g., as described below.

In some demonstrative embodiments, controller 124 may be configured to control, cause and/or trigger device 102 to generate the wakeup packet including the preamble having a length corresponding to an MCS of a beacon frame transmission from device 102, for example, when the wakeup packet, for example, a payload, e.g., payload 204 (FIG. 2), of the wakeup packet includes beacon information, e.g., the partial beacon information.

In some demonstrative embodiments, device 102 may transmit the wakeup packet, and device 140 may receive the wakeup packet.

In some demonstrative embodiments, wakeup receiver 150 may process the wakeup beacon, for example, to maintain association and/or synchronization with device 102.

In some demonstrative embodiments, wakeup receiver 150 may not necessarily wake up radio 144, for example, when processing the wakeup beacon.

In one example, when an AP, e.g., device 102, transmits a wakeup packet including partial beacon information, e.g., the wakeup beacon, the AP may select the preamble length of the wakeup packet based on the MCS at which the AP transmits a beacon frame. For example, if the AP uses the MCS1, e.g., a QPSK ½ rate, to transmit the beacon frame, for example, due to a shorter coverage range, the AP may use a shorter wake-up preamble, e.g. having a preamble length of 15 bits, e.g., instead of a preamble length of 30 bits.

In some demonstrative embodiments, reducing the length of the wakeup preamble of the wakeup beacon, may match between the coverage range of the wakeup beacon and the converge range of the beacon frame transmission, e.g., a regular beacon frame transmission, from device 102.

In some demonstrative embodiments, device 140 may receive the wakeup packet including the preamble having the preamble length corresponding to the beacon MCS.

In some demonstrative embodiments, wakeup receiver 150 may process the wakeup beacon, for example, to maintain association and/or synchronization with device 102.

In some demonstrative embodiments, controller 124 may be configured to control, cause and/or trigger device 102 to generate the wakeup packet including the preamble having a length corresponding to an MCS, e.g., the data MCS, of a data transmission to device 102, for example, when the wakeup packet, for example, a payload of the wakeup packet, includes a wakeup indication to wakeup radio 144 of device 140.

In some demonstrative embodiments, controller 154 may be configured to control, cause and/or trigger device 140 to transmit to device 102 MCS information to indicate the MCS to be applied to the data transmission from device 102 to device 140. For example, device 140 to transmit to device 102 the MCS information to indicate that the MCS3 to be applied to the data transmission.

In some demonstrative embodiments, controller 124 may be configured to control, cause and/or trigger device 102 to determine the MCS to be used for transmitting the data transmission to device 140 based on the MCS information received from device 140.

In some demonstrative embodiments, controller 124 may be configured to control, cause and/or trigger transmitter 118 to transmit the wakeup packet including the preamble having the length corresponding to the MCS received from device 140, e.g., the MCS3.

In some demonstrative embodiments, device 140 may receive the wakeup packet including the preamble having the length corresponding to the MCS of the data transmission, e.g., the MCS3.

In some demonstrative embodiments, controller 157 may be configured to control, cause and/or trigger wakeup receiver 150 to process the wakeup packet including the preamble having the length corresponding to the MCS of the data transmission.

In some demonstrative embodiments, controller 157 may be configured to control, cause and/or trigger device 140 to wakeup the radio 144 to receive the data transmission from device 102, e.g., using the MCS indicated by the MCS information.

In some demonstrative embodiments, when an AP, e.g., device 102, transmits the wakeup packet to indicate to a STA, e.g., device 140, that data is to be transmitted to the STA, e.g., as part of a unicast packet, the AP may be configured to select between setting a preamble length of the wakeup packet according to a data MCS, and setting the preamble length of the wakeup packet according to a beacon MCS. For example, the AP may be configured to select a preamble length for the wakeup packet based on the MCS of the data transmission, e.g., the MCS2, for example, if the AP uses a data MCS, e.g., MCS2, for example, which is higher than a beacon MCS, e.g., MCS1. For example, according to Table 1, the AP may select to use a preamble length corresponding to the MCS2, e.g., a preamble length having N/4 bits.

In one example, a STA, device 140, may notify the AP, for example, before the STA turns off its radio and enters the sleep mode, of an MCS, e.g., MCS2, that the STA will be using for processing a data packet transmission. The STA may determine the preamble length, for example, based on the mapping information transmitted by the AP to the STA.

In some demonstrative embodiments, a STA, e.g., device 140, may be configured to run a correlation-based preamble detection mechanism, for example, to detect the preamble length, e.g., of a beacon frame transmission and/or data transmissions, for example, in order to detect an incoming wakeup packet acquisition, e.g., when using the second length setting scheme.

In some demonstrative embodiments, the second length-setting scheme may enable device 102 to save additional power and bandwidth, for example, when the MCS of the data transmission is higher than the MCS of the beacon frame.

In some demonstrative embodiments, devices 102 and 140 may be configured to signal and/or negotiate a length setting scheme, e.g., to set and/or select between the first length setting scheme and the second length setting scheme, for example, during an initialization or capability exchange phase.

In some demonstrative embodiments, device 102 and device 140 may communicate according to a length setting scheme, for example, once devices 102 and 140 agree on a length setting scheme, and/or once one of devices 102 and 104 indicates to the other device, which length setting scheme is to be used.

In other embodiments, the length-setting scheme may be predefined, preconfigured, and/or predetermined.

Figure 5:
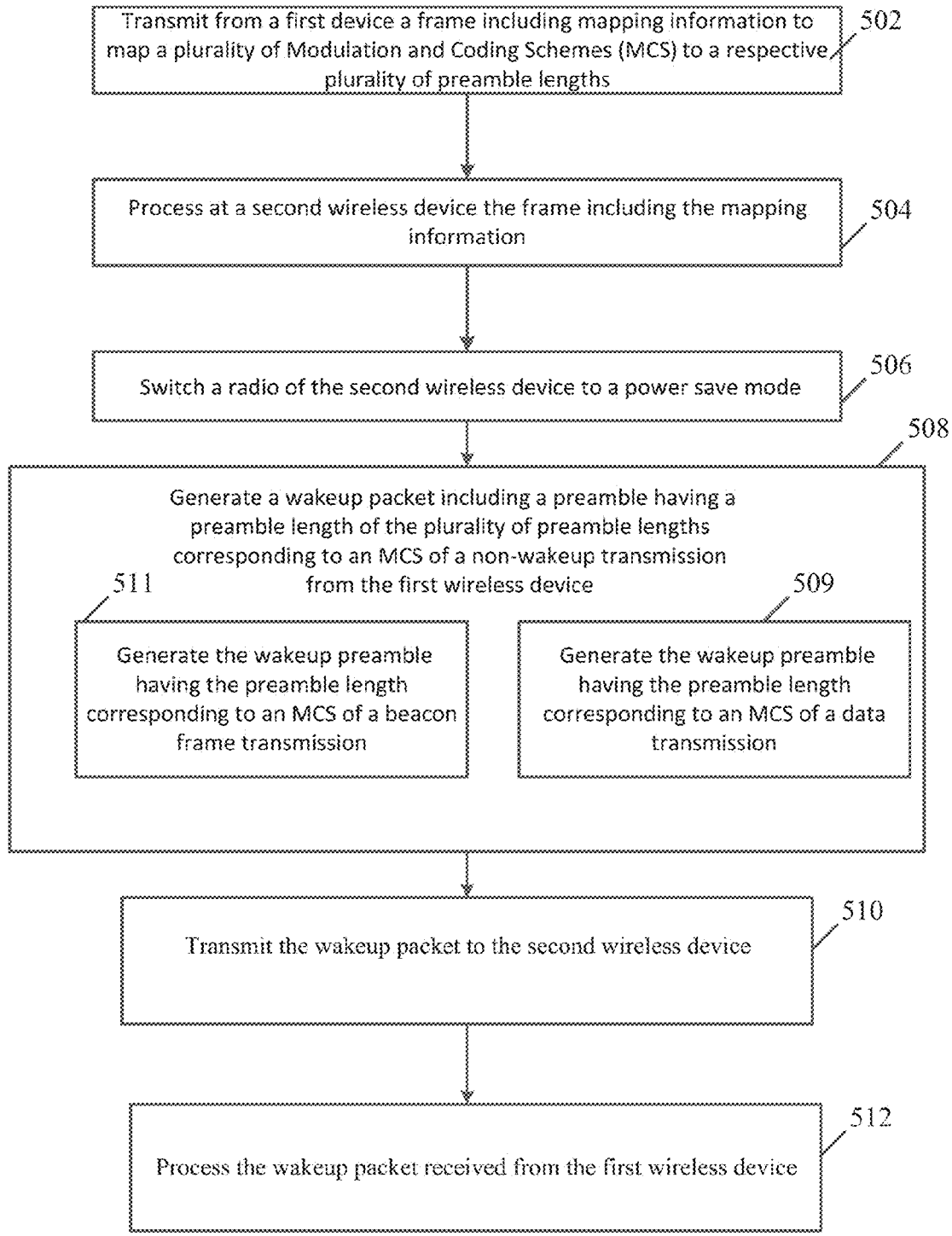
FIG. 5 is a schematic flow-chart illustration of a method of communicating a wakeup packet, in accordance with some demonstrative embodiments.

Reference is made to FIG. 5, which schematically illustrates a method of communicating a wakeup packet, in accordance with some demonstrative embodiments. For example, one or more of the operations of the method of FIG. 5 may be performed by one or more elements of a system, e.g., system 100 (FIG. 1), for example, one or more wireless devices, e.g., device 102 (FIG. 1), and/or device 140 (FIG. 1); a controller, e.g., controller 159 (FIG. 1), controller 124 (FIG. 1) and/or controller 154 (FIG. 1); a radio, e.g., radio 114 (FIG. 1) and/or radio 144 (FIG. 1); a transmitter, e.g., transmitter 118 and/or transmitter 148 (FIG. 1); a receiver e.g., receiver 116, receiver 156 and/or receiver 146 (FIG. 1); a wakeup receiver, e.g., wakeup receiver 150 (FIG. 1); and/or a message processor, e.g., message processor 157 (FIG. 1), message processor 128 (FIG. 1) and/or message processor 158 (FIG. 1).

As indicated at block 502, the method may include transmitting from a first device a frame including mapping information to map a plurality of Modulation and Coding Schemes (MCS) to a respective plurality of preamble lengths. For example, controller 124 (FIG. 1) may control, cause and/or trigger transmitter 118 (FIG. 1) and/or radio 124 (FIG. 1) to transmit the frame including mapping information to map a plurality of Modulation and Coding Schemes (MCS) to a respective plurality of preamble lengths, e.g., as described above.

As indicated at block 504, the method may include processing the frame including the mapping information at a second wireless device. For example, controller 154 (FIG. 1) may control, cause and/or trigger receiver 146 (FIG. 1) to process the frame including the mapping information, e.g., as described above.

As indicated at block 506, the method may include switching a radio of the second wireless device to a power save mode. For example, controller 154 (FIG. 1) may control, cause and/or trigger device 14 (FIG. 1) to switch radio 144 (FIG. 1) of to the power save mode, e.g., as described above.

As indicated at block 508, the method may include generating a wakeup packet including a preamble having a preamble length corresponding to an MCS of a non-wakeup transmission from the first wireless device. For example, controller 124 (FIG. 1) may control, cause and/or trigger message processor 128 (FIG. 1) and/or radio 124 (FIG. 1) to generate the wakeup packet including the preamble having a preamble length corresponding to an MCS of a non-wakeup transmission from the first wireless device, for example, according to Table 1, e.g., as described above.

As indicated at block 509, generating the wakeup packet may include generating the wakeup preamble having the preamble length corresponding to an MCS of a beacon frame transmission. For example, controller 124 (FIG. 1) may control, cause and/or trigger message processor 128 (FIG. 1) and/or radio 124 (FIG. 1) to generate the wakeup packet including the preamble having a preamble length of the beacon frame transmission, e.g., as described above.

As indicated at block 511, generating the wakeup packet may include generating the wakeup preamble having the preamble length corresponding to an MCS of a data transmission. For example, controller 124 (FIG. 1) may control, cause and/or trigger message processor 128 (FIG. 1) and/or radio 124 (FIG. 1) to generate the wakeup packet including the preamble having a preamble length of the data transmission, e.g., as described above.

As indicated at block 510, the method may include transmitting the wakeup packet to the second wireless device. For example, controller 124 (FIG. 1) may control, cause and/or trigger radio 124 (FIG. 1) to transmit the wakeup packet to device 140 (FIG. 1), e.g., as described above.

As indicated at block 512, the method may include processing the wakeup packet received from the first wireless device. For example, controller 159 (FIG. 1) may control, cause and/or trigger wakeup receiver 150 (FIG. 1) to process the wakeup packet, e.g., as described above.

Figure 6:
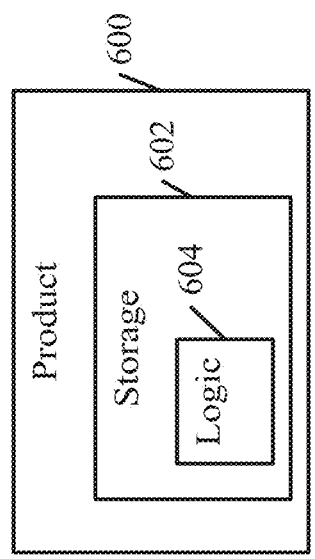
FIG. 6 is a schematic illustration of a product of manufacture, in accordance with some demonstrative embodiments.

Reference is made to FIG. 6, which schematically illustrates a product of manufacture 600, in accordance with some demonstrative embodiments. Product 600 may include a non-transitory machine-readable storage medium 602 to store logic 604, which may be used, for example, to perform at least part of the functionality of device 62 (FIG. 1), device 140 (FIG. 1), radio 114 (FIG. 1), radio 144 (FIG. 1), wakeup receiver 150 (FIG. 1), transmitter 118 (FIG. 1), transmitter 148 (FIG. 1), receiver 116 (FIG. 1), receiver 146 (FIG. 1), receiver 156 (FIG. 1), controller 124 (FIG. 1), controller 154 (FIG. 1), controller 159 (FIG. 1), message processor 128 (FIG. 1), message processor 128 (FIG. 1), and/or message processor 158 (FIG. 1), message processor 157 (FIG. 1), and/or to perform one or more operations of FIG. 5, and/or one or more operations described herein. The phrase "non-transitory machine-readable medium" is directed to include all computer-readable media, with the sole exception being a transitory propagating signal.

In some demonstrative embodiments, product 600 and/or machine-readable storage medium 602 may include one or more types of computer-readable storage media capable of storing data, including volatile memory, non-volatile memory, removable or non-removable memory, erasable or non-erasable memory, writeable or re-writeable memory, and the like. For example, machine-readable storage medium 602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising circuitry configured to cause a first wireless device to transmit a frame comprising mapping information to map a plurality of Modulation and Coding Schemes (MCS) to a respective plurality of preamble lengths; generate a wakeup packet comprising a preamble having a preamble length of the plurality of preamble lengths corresponding to an MCS of a non-wakeup transmission from the first wireless device; and transmit the wakeup packet to a second wireless device.

Example 2 includes the subject matter of Example 1, and optionally, wherein the non-wakeup transmission comprises a beacon frame transmission.

Example 3 includes the subject matter of Example 1, and optionally, wherein the non-wakeup transmission comprises a data transmission to the second wireless device.

Example 4 includes the subject matter of Example 1, and optionally, wherein the apparatus is configured to cause the first wireless device to, when the wakeup packet comprises beacon information, generate the wakeup packet comprising the preamble having a length corresponding to an MCS of a beacon frame transmission from the first wireless device.

Example 5 includes the subject matter of Example 1, and optionally, wherein the apparatus is configured to cause the first wireless device to, when the wakeup packet comprises a wakeup indication to wakeup a radio of the second wireless device, generate the wakeup packet comprising the preamble having a length corresponding to an MCS of a data transmission to the second wireless device.

Example 6 includes the subject matter of Example 5, and optionally, wherein the apparatus is configured to cause the first wireless device to determine the MCS of the data transmission based on MCS information received from the second wireless device.

Example 7 includes the subject matter of any one of Examples 1-6, and optionally, wherein the preamble of the wakeup packet is modulated according to an Orthogonal Frequency Division Multiplexing (OFDM) scheme, and a payload of the wakeup packet is modulated according to an On-Off keying (OOK) modulation scheme.

Example 8 includes the subject matter of any one of Examples 1-7, and optionally, wherein the frame comprising the mapping information comprises a beacon frame or a probe response frame.

Example 9 includes the subject matter of any one of Examples 1-8, and optionally, comprising an Access Point (AP).

Example 10 includes the subject matter of any one of Examples 1-9, and optionally, comprising a radio to transmit the wakeup packet.

Example 11 includes the subject matter of any one of Examples 1-10, and optionally, comprising one or more antennas, a processor, and a memory.

Example 12 includes a system of wireless communication comprising a first wireless device comprising circuitry to cause the first wireless device to transmit a frame comprising mapping information to map a plurality of Modulation and Coding Schemes (MCS) to a respective plurality of preamble lengths; generate a wakeup packet comprising a preamble having a preamble length of the plurality of preamble lengths corresponding to an MCS of a non-wakeup transmission from the first wireless device; and transmit the wakeup packet to a second wireless device.

Example 13 includes the subject matter of Example 12, and optionally, wherein the non-wakeup transmission comprises a beacon frame transmission.

Example 14 includes the subject matter of Example 12, and optionally, wherein the non-wakeup transmission comprises a data transmission to the second wireless device.

Example 15 includes the subject matter of Example 12, and optionally, wherein the circuitry is configured to cause the first wireless device to, when the wakeup packet comprises beacon information, generate the wakeup packet comprising the preamble having a length corresponding to an MCS of a beacon frame transmission from the first wireless device.

Example 16 includes the subject matter of Example 12, and optionally, wherein the circuitry is configured to cause the first wireless device to, when the wakeup packet comprises a wakeup indication to wakeup a radio of the second wireless device, generate the wakeup packet comprising the preamble having a length corresponding to an MCS of a data transmission to the second wireless device.

Example 17 includes the subject matter of Example 16, and optionally, wherein the circuitry is configured to cause the first wireless device to determine the MCS of the data transmission based on MCS information received from the second wireless device.

Example 18 includes the subject matter of any one of Examples 12-17, and optionally, wherein the preamble of the wakeup packet is modulated according to an Orthogonal Frequency Division Multiplexing (OFDM) scheme, and a payload of the wakeup packet is modulated according to an On-Off keying (OOK) modulation scheme.

Example 19 includes the subject matter of any one of Examples 12-18, and optionally, wherein the frame comprising the mapping information comprises a beacon frame or a probe response frame.

Example 20 includes the subject matter of any one of Examples 12-19, and optionally, comprising an Access Point (AP).

Example 21 includes the subject matter of any one of Examples 12-20, and optionally, wherein the first wireless device comprises a radio to transmit the wakeup packet.

Example 22 includes the subject matter of any one of Examples 12-21, and optionally, wherein the first wireless device comprises one or more antennas, a processor, and a memory.

Example 23 includes a method to be performed by a first wireless device, the method comprising transmitting a frame comprising mapping information to map a plurality of Modulation and Coding Schemes (MCS) to a respective plurality of preamble lengths; generating a wakeup packet comprising a preamble having a preamble length of the plurality of preamble lengths corresponding to an MCS of a non-wakeup transmission from the first wireless device; and transmitting the wakeup packet to a second wireless device.

Example 24 includes the subject matter of Example 23, and optionally, wherein the non-wakeup transmission comprises a beacon frame transmission.

Example 25 includes the subject matter of Example 23, and optionally, wherein the non-wakeup transmission comprises a data transmission to the second wireless device.

Example 26 includes the subject matter of Example 23, and optionally, comprising, when the wakeup packet comprises beacon information, generating the wakeup packet comprising the preamble having a length corresponding to an MCS of a beacon frame transmission from the first wireless device.

Example 27 includes the subject matter of Example 23, and optionally, comprising, when the wakeup packet comprises a wakeup indication to wakeup a radio of the second wireless device, generating the wakeup packet comprising the preamble having a length corresponding to an MCS of a data transmission to the second wireless device.

Example 28 includes the subject matter of Example 27, and optionally, comprising determining the MCS of the data transmission based on MCS information received from the second wireless device.

Example 29 includes the subject matter of any one of Examples 23-28, and optionally, wherein the preamble of the wakeup packet is modulated according to an Orthogonal Frequency Division Multiplexing (OFDM) scheme, and a payload of the wakeup packet is modulated according to an On-Off keying (OOK) modulation scheme.

Example 30 includes the subject matter of any one of Examples 23-29, and optionally, wherein the frame comprising the mapping information comprises a beacon frame or a probe response frame.

Example 31 includes the subject matter of any one of Examples 23-30, and optionally, wherein the first wireless device comprises an Access Point (AP).

Example 32 includes a product comprising one or more tangible computer-readable non-transitory storage media comprising computer-executable instructions operable to, when executed by at least one computer processor, enable the at least one computer processor to implement one or more operations at a first wireless device, the operations comprising transmitting a frame comprising mapping information to map a plurality of Modulation and Coding Schemes (MCS) to a respective plurality of preamble lengths; generating a wakeup packet comprising a preamble having a preamble length of the plurality of preamble lengths corresponding to an MCS of a non-wakeup transmission from the first wireless device; and transmitting the wakeup packet to a second wireless device.

Example 33 includes the subject matter of Example 32, and optionally, wherein the non-wakeup transmission comprises a beacon frame transmission.

Example 34 includes the subject matter of Example 32, and optionally, wherein the non-wakeup transmission comprises a data transmission to the second wireless device.

Example 35 includes the subject matter of Example 32, and optionally, wherein the operations comprise, when the wakeup packet comprises beacon information, generating the wakeup packet comprising the preamble having a length corresponding to an MCS of a beacon frame transmission from the first wireless device.

Example 36 includes the subject matter of Example 32, and optionally, wherein the operations comprise, when the wakeup packet comprises a wakeup indication to wakeup a radio of the second wireless device, generating the wakeup packet comprising the preamble having a length corresponding to an MCS of a data transmission to the second wireless device.

Example 37 includes the subject matter of Example 36, and optionally, wherein the operations comprise determining the MCS of the data transmission based on MCS information received from the second wireless device.

Example 38 includes the subject matter of any one of Examples 32-37, and optionally, wherein the preamble of the wakeup packet is modulated according to an Orthogonal Frequency Division Multiplexing (OFDM) scheme, and a payload of the wakeup packet is modulated according to an On-Off keying (OOK) modulation scheme.

Example 39 includes the subject matter of any one of Examples 32-38, and optionally, wherein the frame comprising the mapping information comprises a beacon frame or a probe response frame.

Example 40 includes the subject matter of any one of Examples 32-39, and optionally, wherein the first wireless device comprises an Access Point (AP).

Example 41 includes an apparatus of wireless communication by a first wireless device, the apparatus comprising means for transmitting a frame comprising mapping information to map a plurality of Modulation and Coding Schemes (MCS) to a respective plurality of preamble lengths; means for generating a wakeup packet comprising a preamble having a preamble length of the plurality of preamble lengths corresponding to an MCS of a non-wakeup transmission from the first wireless device; and means for transmitting the wakeup packet to a second wireless device.

Example 42 includes the subject matter of Example 41, and optionally, wherein the non-wakeup transmission comprises a beacon frame transmission.

Example 43 includes the subject matter of Example 41, and optionally, wherein the non-wakeup transmission comprises a data transmission to the second wireless device.

Example 44 includes the subject matter of Example 41, and optionally, comprising means for, when the wakeup packet comprises beacon information, generating the wakeup packet comprising the preamble having a length corresponding to an MCS of a beacon frame transmission from the first wireless device.

Example 45 includes the subject matter of Example 41, and optionally, comprising means for, when the wakeup packet comprises a wakeup indication to wakeup a radio of the second wireless device, generating the wakeup packet comprising the preamble having a length corresponding to an MCS of a data transmission to the second wireless device.

Example 46 includes the subject matter of Example 45, and optionally, comprising means for determining the MCS of the data transmission based on MCS information received from the second wireless device.

Example 47 includes the subject matter of any one of Examples 41-46, and optionally, wherein the preamble of the wakeup packet is modulated according to an Orthogonal Frequency Division Multiplexing (OFDM) scheme, and a payload of the wakeup packet is modulated according to an On-Off keying (OOK) modulation scheme.

Example 48 includes the subject matter of any one of Examples 41-47, and optionally, wherein the frame comprising the mapping information comprises a beacon frame or a probe response frame.

Example 49 includes the subject matter of any one of Examples 41-48, and optionally, wherein the first wireless device comprises an Access Point (AP).

Example 50 includes an apparatus comprising circuitry configured to cause a first wireless device to process a frame received from a second wireless device, the frame comprising mapping information to map a plurality of Modulation and Coding Schemes (MCS) to a respective plurality of preamble lengths; switch a radio of the first wireless device to a power save mode; and process a wakeup packet received from the second wireless device, the wakeup packet comprising a preamble having a preamble length of the plurality of preamble lengths corresponding to an MCS of a non-wakeup transmission from the second wireless device.

Example 51 includes the subject matter of Example 50, and optionally, wherein the non-wakeup transmission comprises a beacon frame transmission from the second wireless device.

Example 52 includes the subject matter of Example 50, and optionally, wherein the non-wakeup transmission comprises a data transmission from the second wireless device.

Example 53 includes the subject matter of Example 52, and optionally, wherein the apparatus is configured to cause the first wireless device to wakeup the radio to receive the data transmission.

Example 54 includes the subject matter of Example 52, and optionally, wherein the apparatus is configured to cause the first wireless device to transmit to the second wireless device MCS information to indicate the MCS to be applied to the data transmission.

Example 55 includes the subject matter of Example 50, and optionally, wherein the wakeup packet comprises the preamble having a length corresponding to an MCS of a beacon frame transmission from the second wireless device, when the wakeup packet comprises beacon information.

Example 56 includes the subject matter of Example 50, and optionally, wherein the wakeup packet comprises the preamble having a length corresponding to an MCS of a data transmission from the second wireless device, when the wakeup packet comprises an indication to wakeup the radio.

Example 57 includes the subject matter of any one of Examples 50-56, and optionally, wherein the apparatus is configured to cause the first wireless device to demodulate the preamble of the wakeup packet according to an Orthogonal Frequency Division Multiplexing (OFDM) scheme, and to demodulate a payload of the wakeup packet according to an On-Off keying (OOK) modulation scheme.

Example 58 includes the subject matter of any one of Examples 50-57, and optionally, comprising the radio, and a wakeup receiver to receive the wakeup packet.

Example 59 includes the subject matter of any one of Examples 50-58, and optionally, comprising one or more antennas, and a memory.

Example 60 includes a system of wireless communication comprising a first wireless device comprising circuitry to cause the first wireless device to process a frame received from a second wireless device, the frame comprising mapping information to map a plurality of Modulation and Coding Schemes (MCS) to a respective plurality of preamble lengths; switch a radio of the first wireless device to a power save mode; and process a wakeup packet received from the second wireless device, the wakeup packet comprising a preamble having a preamble length of the plurality of preamble lengths corresponding to an MCS of a non-wakeup transmission from the second wireless device.

Example 61 includes the subject matter of Example 60, and optionally, wherein the non-wakeup transmission comprises a beacon frame transmission from the second wireless device.

Example 62 includes the subject matter of Example 60, and optionally, wherein the non-wakeup transmission comprises a data transmission from the second wireless device.

Example 63 includes the subject matter of Example 62, and optionally, wherein the circuitry is configured to cause the first wireless device to wakeup the radio to receive the data transmission.

Example 64 includes the subject matter of Example 62, and optionally, wherein the circuitry is configured to cause the first wireless device to transmit to the second wireless device MCS information to indicate the MCS to be applied to the data transmission.

Example 65 includes the subject matter of Example 60, and optionally, wherein the wakeup packet comprises the preamble having a length corresponding to an MCS of a beacon frame transmission from the second wireless device, when the wakeup packet comprises beacon information.

Example 66 includes the subject matter of Example 60, and optionally, wherein the wakeup packet comprises the preamble having a length corresponding to an MCS of a data transmission from the second wireless device, when the wakeup packet comprises an indication to wakeup the radio.

Example 67 includes the subject matter of any one of Examples 60-66, and optionally, wherein the circuitry is configured to cause the first wireless device to demodulate the preamble of the wakeup packet according to an Orthogonal Frequency Division Multiplexing (OFDM) scheme, and to demodulate a payload of the wakeup packet according to an On-Off keying (OOK) modulation scheme.

Example 68 includes the subject matter of any one of Examples 60-67, and optionally, wherein the first wireless device comprises the radio, and a wakeup receiver to receive the wakeup packet.

Example 69 includes the subject matter of any one of Examples 60-68, and optionally, wherein the first wireless device comprises one or more antennas, and a memory.

Example 70 includes a method to be performed by a first wireless device, the method comprising processing a frame received from a second wireless device, the frame comprising mapping information to map a plurality of Modulation and Coding Schemes (MCS) to a respective plurality of preamble lengths; switching a radio of the first wireless device to a power save mode; and processing a wakeup packet received from the second wireless device, the wakeup packet comprising a preamble having a preamble length of the plurality of preamble lengths corresponding to an MCS of a non-wakeup transmission from the second wireless device.

Example 71 includes the subject matter of Example 70, and optionally, wherein the non-wakeup transmission comprises a beacon frame transmission from the second wireless device.

Example 72 includes the subject matter of Example 70, and optionally, wherein the non-wakeup transmission comprises a data transmission from the second wireless device.

Example 73 includes the subject matter of Example 72, and optionally, comprising waking up the radio to receive the data transmission.

Example 74 includes the subject matter of Example 72, and optionally, comprising transmitting to the second wireless device MCS information to indicate the MCS to be applied to the data transmission.

Example 75 includes the subject matter of Example 70, and optionally, wherein the wakeup packet comprises the preamble having a length corresponding to an MCS of a beacon frame transmission from the second wireless device, when the wakeup packet comprises beacon information.

Example 76 includes the subject matter of Example 70, and optionally, wherein the wakeup packet comprises the preamble having a length corresponding to an MCS of a data transmission from the second wireless device, when the wakeup packet comprises an indication to wakeup the radio.

Example 77 includes the subject matter of any one of Examples 70-76, and optionally, comprising demodulating the preamble of the wakeup packet according to an Orthogonal Frequency Division Multiplexing (OFDM) scheme, and to demodulate a payload of the wakeup packet according to an On-Off keying (OOK) modulation scheme.

Example 78 includes a product comprising one or more tangible computer-readable non-transitory storage media comprising computer-executable instructions operable to, when executed by at least one computer processor, enable the at least one computer processor to implement one or more operations at a first wireless device, the operations comprising processing a frame received from a second wireless device, the frame comprising mapping information to map a plurality of Modulation and Coding Schemes (MCS) to a respective plurality of preamble lengths; switching a radio of the first wireless device to a power save mode; and processing a wakeup packet received from the second wireless device, the wakeup packet comprising a preamble having a preamble length of the plurality of preamble lengths corresponding to an MCS of a non-wakeup transmission from the second wireless device.

Example 79 includes the subject matter of Example 78, and optionally, wherein the non-wakeup transmission comprises a beacon frame transmission from the second wireless device.

Example 80 includes the subject matter of Example 78, and optionally, wherein the non-wakeup transmission comprises a data transmission from the second wireless device.

Example 81 includes the subject matter of Example 80, and optionally, wherein the operations comprise waking up the radio to receive the data transmission.

Example 82 includes the subject matter of Example 80, and optionally, wherein the operations comprise transmitting to the second wireless device MCS information to indicate the MCS to be applied to the data transmission.

Example 83 includes the subject matter of Example 78, and optionally, wherein the wakeup packet comprises the preamble having a length corresponding to an MCS of a beacon frame transmission from the second wireless device, when the wakeup packet comprises beacon information.

Example 84 includes the subject matter of Example 78, and optionally, wherein the wakeup packet comprises the preamble having a length corresponding to an MCS of a data transmission from the second wireless device, when the wakeup packet comprises an indication to wakeup the radio.

Example 85 includes the subject matter of any one of Examples 78-84, and optionally, wherein the operations comprise demodulating the preamble of the wakeup packet according to an Orthogonal Frequency Division Multiplexing (OFDM) scheme, and to demodulate a payload of the wakeup packet according to an On-Off keying (OOK) modulation scheme.

Example 86 includes an apparatus of wireless communication by a first wireless device, the apparatus comprising means for processing a frame received from a second wireless device, the frame comprising mapping information to map a plurality of Modulation and Coding Schemes (MCS) to a respective plurality of preamble lengths; means for switching a radio of the first wireless device to a power save mode; and means for processing a wakeup packet received from the second wireless device, the wakeup packet comprising a preamble having a preamble length of the plurality of preamble lengths corresponding to an MCS of a non-wakeup transmission from the second wireless device.

Example 87 includes the subject matter of Example 86, and optionally, wherein the non-wakeup transmission comprises a beacon frame transmission from the second wireless device.

Example 88 includes the subject matter of Example 86, and optionally, wherein the non-wakeup transmission comprises a data transmission from the second wireless device.

Example 89 includes the subject matter of Example 88, and optionally, comprising means for waking up the radio to receive the data transmission.

Example 90 includes the subject matter of Example 88, and optionally, comprising means for transmitting to the second wireless device MCS information to indicate the MCS to be applied to the data transmission.

Example 91 includes the subject matter of Example 86, and optionally, wherein the wakeup packet comprises the preamble having a length corresponding to an MCS of a beacon frame transmission from the second wireless device, when the wakeup packet comprises beacon information.

Example 92 includes the subject matter of Example 86, and optionally, wherein the wakeup packet comprises the preamble having a length corresponding to an MCS of a data transmission from the second wireless device, when the wakeup packet comprises an indication to wakeup the radio.

Example 93 includes the subject matter of any one of Examples 86-92, and optionally, comprising means for demodulating the preamble of the wakeup packet according to an Orthogonal Frequency Division Multiplexing (OFDM) scheme, and to demodulate a payload of the wakeup packet according to an On-Off keying (OOK) modulation scheme.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
a memory; and
a processor configured to cause a first wireless device to:
transmit a frame comprising mapping information to map a plurality of Modulation and Coding Schemes (MCS) to a respective plurality of preamble lengths;
generate a wakeup packet comprising a preamble having a preamble length of said plurality of preamble lengths corresponding to an MCS of a non-wakeup transmission from said first wireless device the preamble of said wakeup packet modulated according to an Orthogonal Frequency Division Multiplexing (OFDM) scheme, and a payload of the wakeup packet modulated according to an On-Off keying (OOK) modulation scheme; and
transmit the wakeup packet to a second wireless device.

2. The apparatus of claim 1, wherein said non-wakeup transmission comprises a beacon frame transmission.

3. The apparatus of claim 1, wherein said non-wakeup transmission comprises a data transmission to said second wireless device.

4. The apparatus of claim 1 configured to cause the first wireless device to, when said wakeup packet comprises beacon information, generate said wakeup packet comprising said preamble, said preamble having a length corresponding to an MCS of a beacon frame transmission from said first wireless device.

5. The apparatus of claim 1 configured to cause the first wireless device to, when said wakeup packet comprises a wakeup indication to wakeup a radio of said second wireless device, generate said wakeup packet comprising said preamble, said preamble having a length corresponding to an MCS of a data transmission to said second wireless device.

6. The apparatus of claim 5 configured to cause the first wireless device to determine the MCS of said data transmission based on MCS information received from said second wireless device.

7. The apparatus of claim 1, wherein said frame comprising said mapping information comprises a beacon frame or a probe response frame.

8. The apparatus of claim 1 comprising an Access Point (AP).

9. The apparatus of claim 1 comprising a radio to transmit said wakeup packet.

10. The apparatus of claim 1 comprising one or more antennas.

11. A product comprising one or more tangible computer-readable non-transitory storage media comprising computer-executable instructions operable to, when executed by at least one processor, enable the at least one processor to cause a first wireless device to:
transmit a frame comprising mapping information to map a plurality of Modulation and Coding Schemes (MCS) to a respective plurality of preamble lengths;
generate a wakeup packet comprising a preamble having a preamble length of said plurality of preamble lengths corresponding to an MCS of a non-wakeup transmission from said first wireless device the preamble of said wakeup packet modulated according to an Orthogonal Frequency Division Multiplexing (OFDM) scheme, and a payload of the wakeup packet modulated according to an On-Off keying (OOK) modulation scheme; and
transmit the wakeup packet to a second wireless device.

12. The product of claim 11, wherein the instructions, when executed, cause the first wireless device to, when said wakeup packet comprises beacon information, generate said wakeup packet comprising said preamble having a length corresponding to an MCS of a beacon frame transmission from said first wireless device.

13. The product of claim 11, wherein the instructions, when executed, cause the first wireless device to, when said wakeup packet comprises a wakeup indication to wakeup a radio of said second wireless device, generate said wakeup packet comprising said preamble having a length corresponding to an MCS of a data transmission to said second wireless device.

14. An apparatus comprising:
a memory; and
a processor configured to cause a first wireless device to:
process a frame received from a second wireless device, the frame comprising mapping information to map a plurality of Modulation and Coding Schemes (MCS) to a respective plurality of preamble lengths;
switch a radio of the first wireless device to a power save mode; and
process a wakeup packet received from said second wireless device, the wakeup packet comprising a preamble having a preamble length of said plurality of preamble lengths corresponding to an MCS of a non-wakeup transmission from said second wireless device the processor configured to cause the first wireless device to demodulate the preamble of said wakeup packet according to an Orthogonal Frequency Division Multiplexing (OFDM) scheme, and to demodulate a payload of the wakeup packet according to an On-Off keying (OOK) modulation scheme.

15. The apparatus of claim 14, wherein said non-wakeup transmission comprises a beacon frame transmission from said second wireless device.

16. The apparatus of claim 14, wherein said non-wakeup transmission comprises a data transmission from said second wireless device.

17. The apparatus of claim 16 configured to cause the first wireless device to wakeup said radio to receive said data transmission.

18. The apparatus of claim 16 configured to cause the first wireless device to transmit to said second wireless device MCS information to indicate the MCS to be applied to said data transmission.

19. The apparatus of claim 14, wherein said preamble has a length corresponding to an MCS of a beacon frame transmission from said second wireless device, when said wakeup packet comprises beacon information.

20. The apparatus of claim 14, wherein said preamble has a length corresponding to an MCS of a data transmission from said second wireless device, when said wakeup packet comprises an indication to wakeup said radio.

21. The apparatus of claim 14 comprising one or more antennas and a memory.

22. The apparatus of claim 14 comprising said radio, and a wakeup receiver to receive said wakeup packet.

23. A product comprising one or more tangible computer-readable non-transitory storage media comprising computer-executable instructions operable to, when executed by at least one processor, enable the at least one processor to cause a first wireless device to:
process a frame received from a second wireless device, the frame comprising mapping information to map a plurality of Modulation and Coding Schemes (MCS) to a respective plurality of preamble lengths;

switch a radio of the first wireless device to a power save mode; and process a wakeup packet received from said second wireless device, the wakeup packet comprising a preamble having a preamble length of said plurality of preamble lengths corresponding to an MCS of a non-wakeup transmission from said second wireless device, the instructions, when executed, cause the first wireless device to demodulate the preamble of said wakeup packet according to an Orthogonal Frequency Division Multiplexing (OFDM) scheme, and to demodulate a payload of the wakeup packet according to an On-Off keying (OOK) modulation scheme.

24. The product of claim 23, wherein said preamble has a length corresponding to an MCS of a data transmission from said second wireless device, when said wakeup packet comprises an indication to wakeup said radio.

* * * * *

UNITED STATES PATENT AND TRADEMARK OFFICE
CERTIFICATE OF CORRECTION

PATENT NO. : 9,974,023 B2  
APPLICATION NO. : 14/864930  
DATED : May 15, 2018  
INVENTOR(S) : Min et al.

Page 1 of 1

It is certified that error appears in the above-identified patent and that said Letters Patent is hereby corrected as shown below:

In the Claims

In Column 31, Line 11, in Claim 1, delete "device the" and insert -- device, the --, therefor.

In Column 31, Line 59, in Claim 11, delete "device the" and insert -- device, the --, therefor.

In Column 32, Line 27, in Claim 14, delete "device the" and insert -- device, the --, therefor.

Signed and Sealed this
Sixteenth Day of October, 2018

Andrei Iancu
*Director of the United States Patent and Trademark Office*